US012645295B1

(12) United States Patent
Chang et al.

(10) Patent No.: US 12,645,295 B1
(45) Date of Patent: Jun. 2, 2026

(54) EYE POSITION DETERMINATION IN HEAD-UP DISPLAY

(71) Applicant: GM Global Technology Operations LLC, Detroit, MI (US)

(72) Inventors: Kai-Han Chang, Farmington Hills, MI (US); Thomas A. Seder, Fraser, MI (US); Omer Tsimhoni, Warren, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 19/285,243

(22) Filed: Jul. 30, 2025

(51) Int. Cl.
  *G06F 3/01* (2006.01)
  *B60K 35/231* (2024.01)
  (Continued)

(52) U.S. Cl.
  CPC ............ *G06F 3/013* (2013.01); *B60K 35/231* (2024.01); *B60K 35/235* (2024.01); *B60K 35/81* (2024.01); *G02B 27/0149* (2013.01); *G06T 7/50* (2017.01); *G06T 7/70* (2017.01); *G09G 3/001* (2013.01); *B60K 2360/21* (2024.01); *B60K 2360/29* (2024.01); *B60K 2360/33* (2024.01); *B60K 2360/595* (2024.01); *G02B 2027/0154* (2013.01); *G06T 2207/30201* (2013.01); *G06T 2207/30268* (2013.01);
  (Continued)

(58) Field of Classification Search
  CPC ... G06F 3/013; G06T 7/50; G06T 7/70; G06T 2207/30201; G06T 2207/30268; G09G 3/001; G09G 2320/0233; G09G 2320/0242; G09G 2354/00; G09G 2380/10; B60K 35/231; B60K 35/81; B60K 35/235; B60K 2360/29; B60K 2360/21; B60K 2360/33; B60K 2360/595; G02B 27/0149; G02B 2027/0154
  See application file for complete search history.

(56) References Cited

U.S. PATENT DOCUMENTS

2021/0263312 A1\*  8/2021  Arndt ................. G02B 27/0101
2023/0104842 A1\*  4/2023  Hwang ................. H04N 13/31
                                                                      348/54
(Continued)

FOREIGN PATENT DOCUMENTS

DE    102010040694 A1    3/2012
DE    102014013221 A1    4/2015

*Primary Examiner* — Muhammad N Edun
(74) *Attorney, Agent, or Firm* — Vivacqua Crane, PLLC

(57) ABSTRACT

A method of calibrating a head up display system includes projecting augmented reality graphics with a picture generation unit, and initiating calibration of the system, including projecting an eye-box pattern to a face of a driver that is not visible to the driver of the vehicle and is detectable by a driver monitoring system (DMS), capturing images containing the face of the driver and the eye-box pattern, receiving and analyzing, by the system controller, the images and calculating a position of eyes of the driver relative to the eye-box by measuring a distance from the eyes to a boundary of the eye-box pattern, and calculating a depth position of the eyes of the driver by measuring width variation within the projected eye-box pattern, and applying adjustments to the image projected by the PGU based on the calculated position of the eyes of the driver relative to the eye-box.

20 Claims, 5 Drawing Sheets

(51) Int. Cl.

| | | |
|---|---|---|
| *B60K 35/235* | (2024.01) | |
| *B60K 35/81* | (2024.01) | |
| *G02B 27/01* | (2006.01) | |
| *G06T 7/50* | (2017.01) | |
| *G06T 7/70* | (2017.01) | |
| *G09G 3/00* | (2006.01) | |

(52) U.S. Cl.

CPC .............. *G09G 2320/0233* (2013.01); *G09G 2320/0242* (2013.01); *G09G 2354/00* (2013.01); *G09G 2380/10* (2013.01)

(56) References Cited

U.S. PATENT DOCUMENTS

| | | | |
|---|---|---|---|
| 2023/0221518 A1* | 7/2023 | Hwang ................... | G02B 7/028 348/42 |
| 2025/0074195 A1* | 3/2025 | Hussain ............... | B60K 35/233 |

* cited by examiner

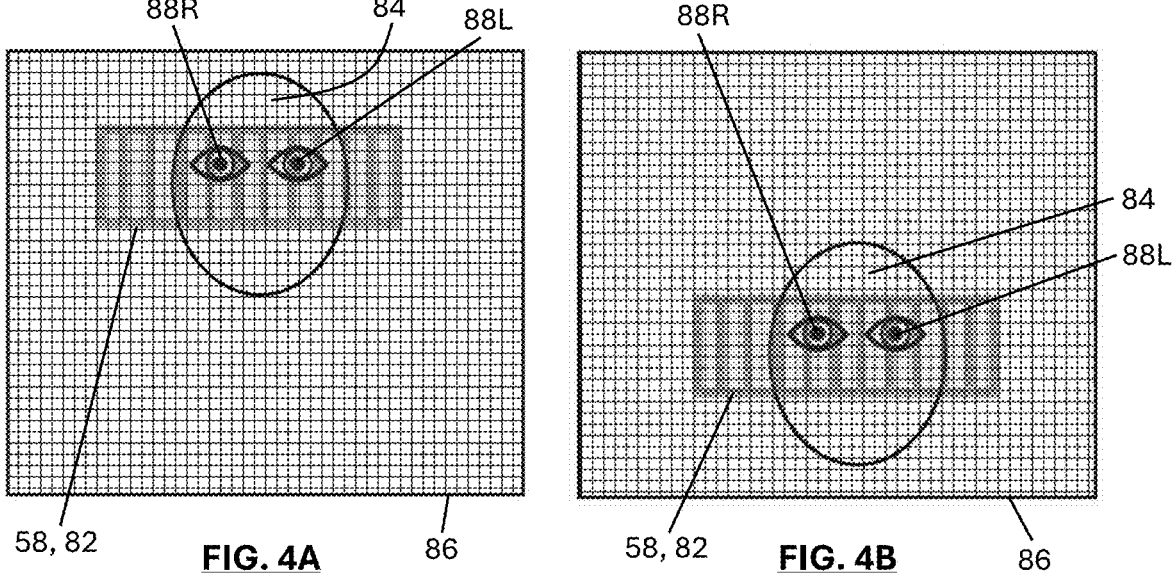
FIG. 4A
FIG. 4B
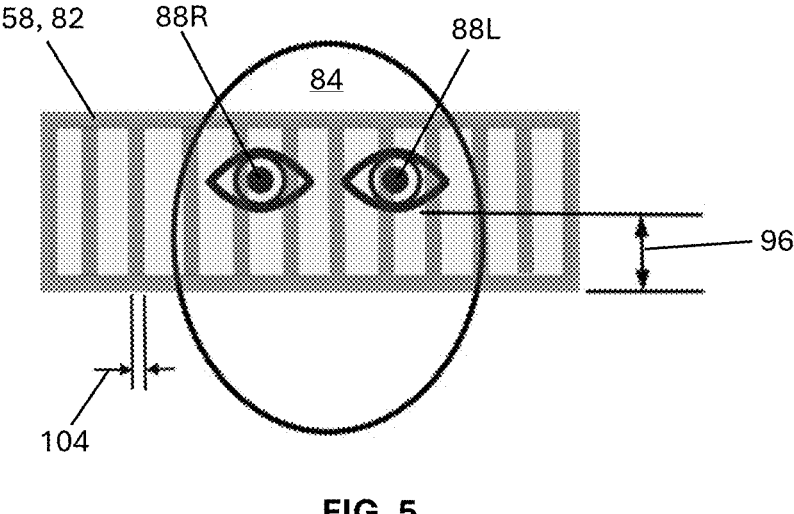
FIG. 5

EYE POSITION DETERMINATION IN HEAD-UP DISPLAY

INTRODUCTION

The present disclosure relates to a head-up display and more particularly to a system and method for determining, with enhanced accuracy, a position of the eyes of a driver viewing the head-up display.

A head-up display (HUD) has become common in modern automobiles. HUDs rely on a driver monitoring system (DMS) to determine a position of the driver's eyes and determine proper positioning of projected images. Inherent inaccuracy within the DMS and movement of the DMS within the vehicle can cause inaccurate determination, by the HUD, of the position of the driver's eyes. This can lead to misalignment of images projected by the HUD relative to the driver's eyes.

Thus, while current HUD systems and methods achieve their intended purpose, there is a need for a new and improved system and method of accurately determining a position of a driver's eyes relative to the HUD.

SUMMARY

According to several aspects of the present disclosure, a method of calibrating a head up display (HUD) system within a vehicle includes projecting, with a picture genera-tion unit (PGU) within the HUD system, augmented reality graphics that are reflected from an inner surface of a windshield of the vehicle to an eye-box, and initiating, by a system controller in communication with the PGU, calibra-tion of the HUD system, including projecting, with a pattern projector within the HUD system in communication with the system controller and fixedly positioned relative to the PGU, an eye-box pattern that is reflected from the inner surface of the windshield of the vehicle to a face of a driver of the vehicle, defines the eye-box of the HUD system, is not visible to the driver of the vehicle and is detectable by a driver monitoring system (DMS) within the vehicle and in communication with the system controller, capturing, with the DMS, images containing the face of the driver and the eye-box pattern projected thereon, receiving, by the system controller, the images captured by the DMS, analyzing, by the system controller, with an image processing algorithm, the images captured by the DMS, calculating, by the system controller, a position of eyes of the driver relative to the eye-box by measuring a distance from the eyes of the driver to a boundary of the eye-box pattern, and calculating a depth position of the eyes of the driver by measuring width variation within the projected eye-box pattern, and applying, by the system controller, adjustments to the image projected by the PGU based on the calculated position of the eyes of the driver relative to the eye-box.

According to another aspect, the applying, by the system controller, adjustments to the image projected by the PGU based on the calculated position of the eyes of the driver relative to the eye-box further includes accessing, by the system controller, a database including a look-up table of pre-determined adjustment parameters for a plurality of locations across the eye-box, selecting, by the system con-troller, pre-determined adjustment parameters correspond-ing to the calculated position of the eyes of the driver relative to the eye-box, and applying, by the system con-troller, the selected pre-determined adjustment parameters to the image projected by the PGU.

According to another aspect, the applying, by the system controller, the selected pre-determined adjustment param-eters to the image projected by the PGU further includes applying an image shift to the image projected by the PGU, applying a warp map to the image projected by the PGU, and applying a luminance and color uniformity correction to the image projected by the PGU.

According to another aspect, the projecting, with the pattern projector within the HUD system, the eye-box pat-tern further includes projecting, with a pattern projector that is mounted onto the PGU, the eye-box pattern.

According to another aspect, the projecting, with the pattern projector within the HUD system, the eye-box pat-tern further includes projecting, with a pattern projector that is mounted, along with the PGU, onto a waveguide of the HUD system.

According to another aspect, the projecting, with the pattern projector within the HUD system, the eye-box pat-tern further includes projecting, with the pattern projector within the HUD system, the eye-box pattern at a non-visible wavelength that matches an operational wavelength of the DMS.

According to another aspect, the projecting, with the pattern projector within the HUD system, the eye-box pat-tern at a non-visible wavelength further includes projecting, with the pattern projector within the HUD system, the eye-box pattern at a wavelength that is less than 400 nano-meters or greater than 700 nano-meters.

According to another aspect, the projecting, with the pattern projector within the HUD system, the eye-box pat-tern at a non-visible wavelength further includes projecting, with the pattern projector within the HUD system, the eye-box pattern in one of infrared light or ultra-violet light.

According to another aspect, the projecting, with the pattern projector within the HUD system, the eye-box pat-tern further includes calculating a hologram for the eye-box pattern, encoding the hologram into a diffractive optical element, projecting, with a light source of the pattern projector within the HUD system, non-visible light through the diffractive optical element of the pattern projector, wherein the non-visible light passing through the diffractive optical element is reflected from the inner surface of the windshield of the vehicle to the face of the driver of the vehicle.

According to another aspect, the encoding the hologram into a diffractive optical element further includes one of encoding the hologram into a photosensitive material, or encoding the hologram into a surface relief grating.

According to another aspect, the initiating, with the system controller, calibration of the HUD system further includes at least one of detecting, by the system controller, that the driver of the vehicle has entered the vehicle, and initiating, by the system controller, calibration of the HUD system upon detection, by the system controller, that the driver of the vehicle has entered the vehicle, and detecting, by the system controller with one of a plurality of sensing devices within the vehicle, movement of a selectively move-able structure within the vehicle onto which the DMS is mounted, and initiating, by the system controller, calibration of the HUD system upon detection, by the system controller, that the selectively moveable structure has been moved.

According to several aspects of the present disclosure, a head up display (HUD) system within a vehicle includes a picture generation unit (PGU) adapted to project augmented reality graphics that are reflected from an inner surface of a windshield of the vehicle to an eye-box, and a system controller in communication with the PGU and adapted to initiate calibration of the HUD system, including, with the system controller, project, with a pattern projector in communication with the system controller and fixedly positioned relative to the PGU, an eye-box pattern that is reflected from the inner surface of the windshield of the vehicle to a face of a driver of the vehicle, defines the eye-box of the HUD system, is not visible to the driver of the vehicle and is detectable by a driver monitoring system (DMS) within the vehicle and in communication with the system controller, capture, with the DMS, images containing the face of the driver and the eye-box pattern projected thereon, receive the images captured by the DMS, analyze, an image processing algorithm, the images captured by the DMS, calculate a position of eyes of the driver relative to the eye-box by measuring a distance from the eyes of the driver to a boundary of the eye-box pattern, and calculating a depth position of the eyes of the driver by measuring width variation within the projected eye-box pattern, and apply adjustments to the image projected by the PGU based on the calculated position of the eyes of the driver relative to the eye-box.

According to another aspect, when applying adjustments to the image projected by the PGU based on the calculated position of the eyes of the driver relative to the eye-box, the system controller is further adapted to access a database including a look-up table of pre-determined adjustment parameters for a plurality of locations across the eye-box, select pre-determined adjustment parameters corresponding to the calculated position of the eyes of the driver relative to the eye-box, and apply the selected pre-determined adjustment parameters to the image projected by the PGU, including applying an image shift to the image projected by the PGU, applying a warp map to the image projected by the PGU, and applying a luminance and color uniformity correction to the image projected by the PGU.

According to another aspect, the pattern projector is mounted onto the PGU.

According to another aspect, the pattern projector and the PGU are mounted onto a waveguide of the HUD system.

According to another aspect, the pattern projector is adapted to project the eye-box pattern at a non-visible wavelength that is less than 400 nano-meters or greater than 700 nano-meters and matches an operational wavelength of the DMS.

According to another aspect, the pattern projector is adapted to project the eye-box pattern in one of infrared light or ultra-violet light.

According to another aspect, the pattern projector includes a light source adapted to project non-visible light through a diffractive optical element having a hologram for the eye-box pattern encoded therein, wherein the diffractive optical element is one of a photosensitive material or a surface relief grating, and the non-visible light passing through the diffractive optical element is reflected from the inner surface of the windshield of the vehicle to the face of the driver of the vehicle.

According to another aspect, the system controller is adapted to initiate calibration of the HUD system upon at least one of detection, by the system controller, that the driver of the vehicle has entered the vehicle, and detection, by the system controller with one of a plurality of sensing devices within the vehicle, movement of a selectively moveable structure within the vehicle onto which the DMS is mounted.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 4A is a perspective view of the field of view of a camera of a driver monitoring system with a face of a driver of the vehicle having a eye-box pattern projected thereon, wherein the face of the driver of the vehicle is positioned high within the field of view of the camera of the driver monitoring system;

FIG. 4B is a perspective view of the field of view of a camera of a driver monitoring system with a face of a driver of the vehicle having a eye-box pattern projected thereon, wherein the face of the driver of the vehicle is positioned low within the field of view of the camera of the driver monitoring system;

FIG. 5 is a schematic diagram of the face of the driver of the vehicle and the eye-box pattern projected thereon;

DETAILED DESCRIPTION

Figure 1:
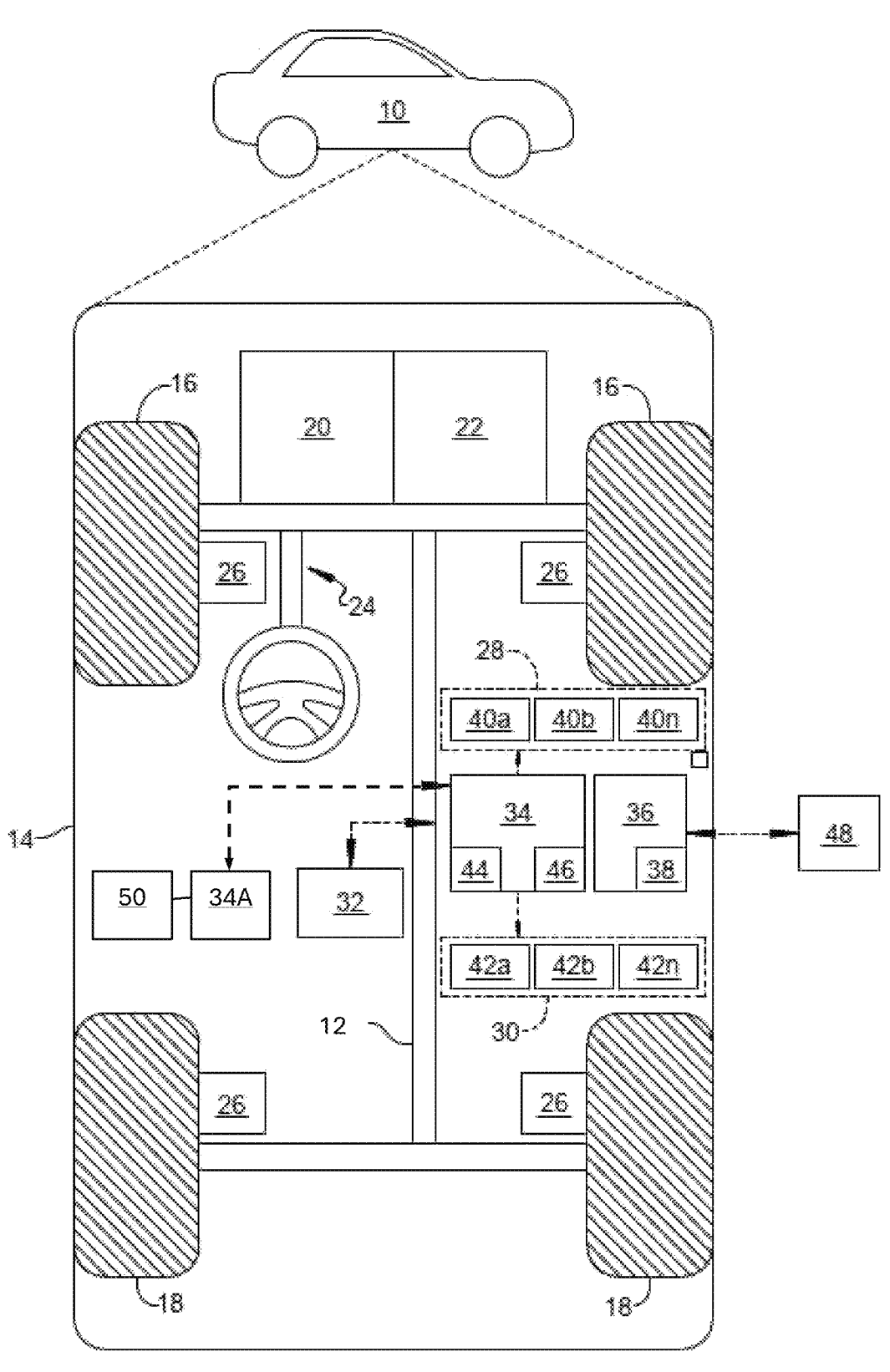
FIG. 1 is a schematic illustration of a vehicle equipped with a head-up display system according to an exemplary embodiment of the present disclosure.

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Although the figures shown herein depict an example with certain arrangements of elements, additional intervening elements, devices, features, or components may be present in actual embodiments. It should also be understood that the figures are merely illustrative and may not be drawn to scale.

As used herein, the term "vehicle" is not limited to automobiles. While the present technology is described primarily herein in connection with automobiles, the technology is not limited to automobiles. The concepts can be used in a wide variety of applications, such as in connection with aircraft, marine craft, other vehicles, and consumer electronic components.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of" Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of" any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about", with reference to percentages, comprises a variation of plus/minus 5%, "about", with reference to temperatures, comprises a variation of plus/minus five degrees, and "about", with reference to distances, comprises plus/minus 10%. In addition, disclosure of ranges includes disclosure of all values and further divided ranges within the entire range, including endpoints and sub-ranges given for the ranges.

In accordance with an exemplary embodiment, FIG. 1 shows a vehicle 10 with an associated head-up-display (HUD) system in accordance with embodiments of the present disclosure. In general, the system 50 works in conjunction with other systems within the vehicle 10 to display various information and infotainment content for the driver. The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The front wheels 16 and rear wheels 18 are each rotationally coupled to the chassis 12 near a respective corner of the body 14.

In various embodiments, the vehicle 10 is an autonomous vehicle and the system 50 is incorporated into the autonomous vehicle 10. An autonomous vehicle 10 is, for example, a vehicle 10 that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), etc., can also be used. In an exemplary embodiment, the vehicle 10 is equipped with a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. The novel aspects of the present disclosure are also applicable to lower levels of automation (Level zero to Level three).

As shown, the vehicle 10 generally includes a propulsion system 20, a transmission system 22, a steering system 24, a brake system 26, a sensor system 28, an actuator system 30, at least one data storage device 32, a vehicle controller 34, and a wireless communication module 36. In an embodiment in which the vehicle 10 is an electric vehicle, there may be no transmission system 22. The propulsion system 20 may, in various embodiments, include an internal combustion engine, an electric machine such as a traction motor, and/or a fuel cell propulsion system. The transmission system 22 is configured to transmit power from the propulsion system 20 to the vehicle's front wheels 16 and rear wheels 18 according to selectable speed ratios. According to various embodiments, the transmission system 22 may include a step-ratio automatic transmission, a continuously-variable transmission, or other appropriate transmission. The brake system 26 is configured to provide braking torque to the vehicle's front wheels 16 and rear wheels 18. The brake system 26 may, in various embodiments, include friction brakes, brake by wire, a regenerative braking system such as an electric machine, and/or other appropriate braking systems. The steering system 24 influences a position of the front wheels 16 and rear wheels 18. While depicted as including a steering wheel for illustrative purposes, in some embodiments contemplated within the scope of the present disclosure, such as for a fully autonomous vehicle, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors. The cameras can include two or more digital cameras spaced at a selected distance from each other, in which the two or more digital cameras are used to obtain stereoscopic images of the surrounding environment in order to obtain a three-dimensional image or map. The plurality of sensing devices 40a-40n is used to determine information about an environment surrounding the vehicle 10. In an exemplary embodiment, the plurality of sensing devices 40a-40n includes at least one of a motor speed sensor, a motor torque sensor, an electric drive motor voltage and/or current sensor, an accelerator pedal position sensor, a coolant temperature sensor, a cooling fan speed sensor, and a transmission oil temperature sensor. In another exemplary embodiment, the plurality of sensing devices 40a-40n further includes sensors to determine information about the environment surrounding the vehicle 10, for example, an ambient air temperature sensor, a barometric pressure sensor, and/or a photo and/or video camera which is positioned to view the environment in front of the vehicle 10. In another exemplary embodiment, at least one of the plurality of sensing devices 40a-40n is capable of measuring distances in the environment surrounding the vehicle 10.

In a non-limiting example wherein the plurality of sensing devices 40a-40n includes a camera, the plurality of sensing devices 40a-40n measures distances using an image processing algorithm configured to process images from the camera and determine distances between objects. In another non-limiting example, the plurality of vehicle sensors 40a-40n includes a stereoscopic camera having distance measurement capabilities. In one example, at least one of the plurality of sensing devices 40a-40n is affixed inside of the vehicle 10, for example, in a headliner of the vehicle 10, having a view through the windshield of the vehicle 10. In another example, at least one of the plurality of sensing devices 40a-40n is a camera affixed outside of the vehicle 10, for example, on a roof of the vehicle 10, having a view of the environment surrounding the vehicle 10 and adapted to collect information (images) related to the environment outside the vehicle 10. It should be understood that various additional types of sensing devices, such as, for example, LiDAR sensors, ultrasonic ranging sensors, radar sensors, and/or time-of-flight sensors are within the scope of the present disclosure. The actuator system 30 includes one or more actuator devices 42a-42n that control one or more vehicle 10 features such as, but not limited to, the propulsion system 20, the transmission system 22, the steering system 24, and the brake system 26.

The vehicle controller 34 includes at least one processor 44 and a computer readable storage device or media 46. The at least one data processor 44 can be any custom made or commercially available processor, a central processing unit (CPU), a graphics processing unit (GPU), an auxiliary processor among several processors associated with the vehicle controller 34, a semi-conductor based microprocessor (in the form of a microchip or chip set), a macro-processor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the at least one data processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which includes an ordered listing of executable instructions for implementing logical functions. The instructions, when executed by the at least one processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one vehicle controller 34 is shown in FIG. 1, embodiments of the vehicle 10 can include any number of controllers that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the vehicle controller 34 are embodied in a trajectory planning system and, when executed by the at least one data processor 44, generates a trajectory output that addresses kinematic and dynamic constraints of the environment. For example, the instructions receive as input process sensor and map data. The instructions perform a graph-based approach with a customized cost function to handle different road scenarios in both urban and highway roads.

The wireless communication module 36 is configured to wirelessly communicate information to and from other remote entities 48, such as but not limited to, other vehicles ("V2V" communication,) infrastructure ("V2I" communication), remote systems, remote servers, cloud computers, and/or personal devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The vehicle controller 34 is a non-generalized, electronic control device having a preprogrammed digital computer or processor, memory or non-transitory computer readable medium used to store data such as control logic, software applications, instructions, computer code, data, lookup tables, etc., and a transceiver [or input/output ports]. Computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code.

Figure 2:
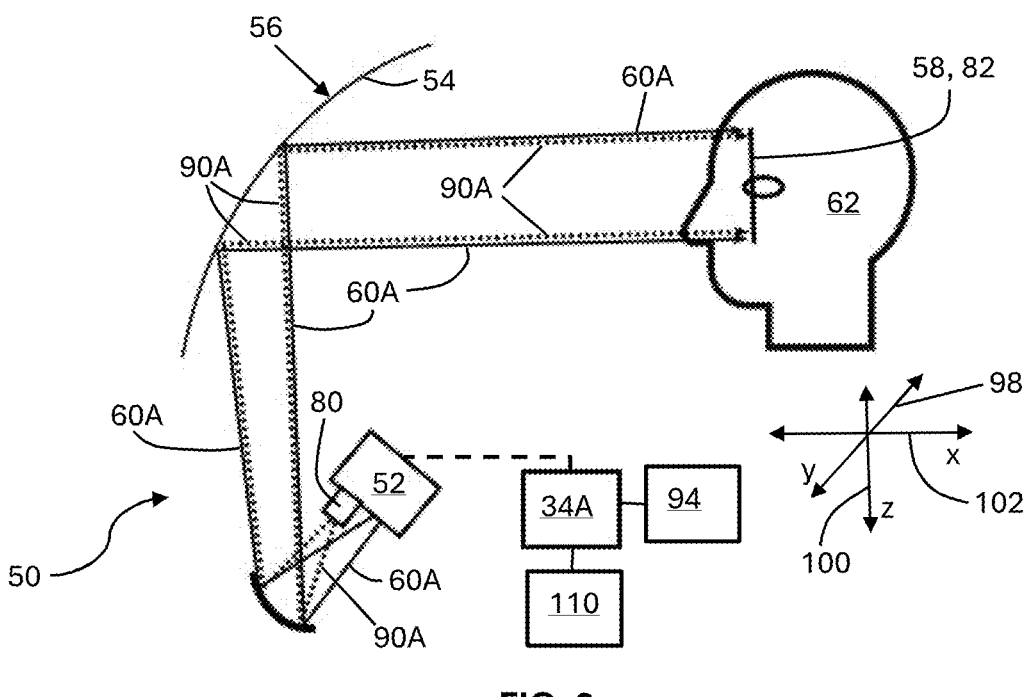
FIG. 2 is a schematic diagram of the head-up system wherein a pattern projector is mounted onto a picture generation unit.

Referring to FIG. 2, the HUD system 50 according to the present disclosure includes a picture generation unit (PGU) 52 that is adapted to project an image including augmented reality graphics upward toward an inner surface 54 of a windshield 56 of the vehicle.

In an exemplary embodiment, the system 10 includes an exit pupil replicator. The image is projected into the exit pupil replicator and then propagates inside the exit pupil replicator and is extracted multiple times before being projected upward to the inner surface 54 of the windshield 56. The re-circulation of the light several times within the exit pupil replicator expands the pupil so the viewer can see the holographic image from an extended eye-box. In addition to expanding the eye-box, the exit pupil replicator also magnifies the original projected image coming out of the PGU 52.

In another exemplary embodiment, the system 50 includes a spatial light modulator that is positioned between the laser or light source of the PGU 52 and the exit pupil replicator. The spatial light modulator is adapted to receive the light from the laser or light source of the PGU 52, to diffract the light with an encoded hologram and to deliver the diffracted laser/light to the exit pupil replicator.

Figure 3:
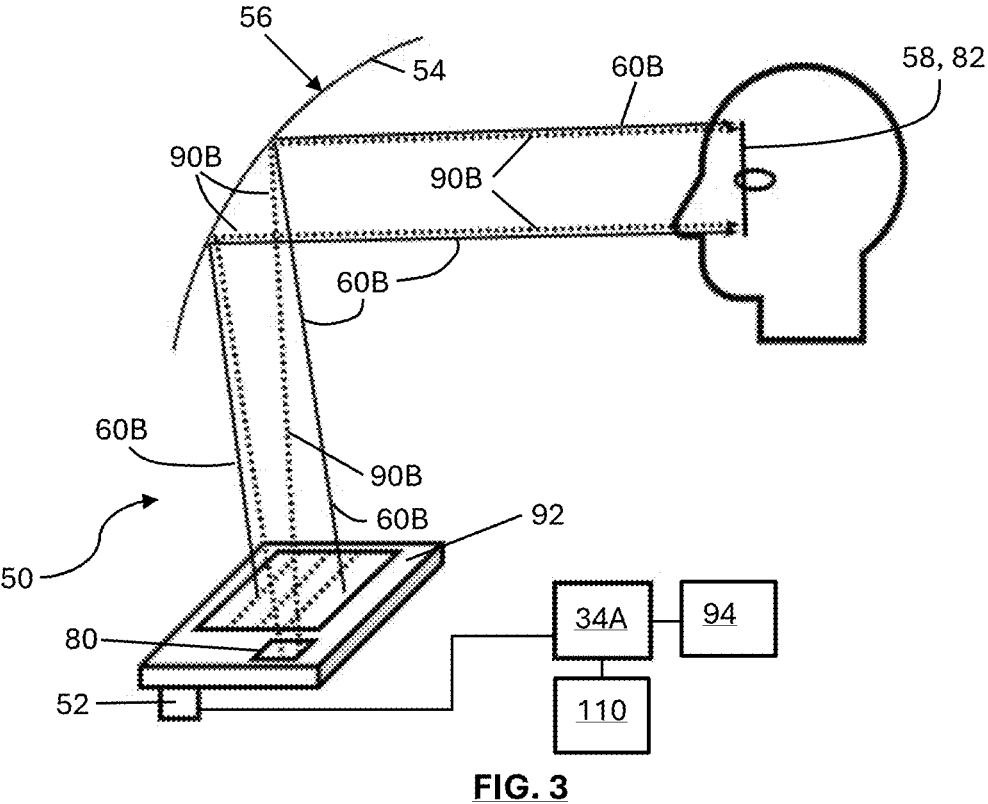
FIG. 3 is a schematic diagram of the head-up system wherein the pattern projector and the picture generation unit are mounted onto a waveguide.

The light/laser from the PGU 52, spatial light modulator and exit pupil replicator are adapted to project the holographic image upward to the inner surface 54 of the windshield 56, wherein projected holographic image reflects from the inner surface 54 of the windshield 56 to an eye-box 58, as shown by solid lines 60A in FIG. 2 and FIG. 3. The eye-box 58 is the three-dimensional region within which a driver 62 of the vehicle 10 can see the entire projected image and graphics from the HUD system 50. An eyellipse is a three-dimensional graphical depiction of a multivariate normal distribution used to approximate the distribution of driver 62 eye locations within the vehicle 10. The eyellipse is represented by two three-dimensional ellipses, one for the right eye and one for the left eye.

A system controller 34A is in communication with the PGU 52 and is adapted to initiate calibration of the HUD system 50. The system controller 34A may be the vehicle controller 34 or, the system controller 34A may be a separate controller dedicated to the HUD system 50 and in communication with the vehicle controller 34. The system controller 34A obtains information of the position of the eyes of the driver 62 of the vehicle 10 from at least one camera 64 associated with a driver monitoring system (DMS) 66 within the vehicle 10. The DMS 66 uses the camera 64 to identify the facial features of the driver 62 and provides information on the location of the eyes of the driver 62 to the system controller 34A. The location of the eyes of the driver 62 is used by the system controller 34A to determine parameters associated with the projected image.

To ensure the driver 62 of the vehicle 10 can properly see the projected image, the eye-box 58 of the projected image must be properly aligned with the eyellipse, which is defined by the location of the driver's 62 eyes. If there is misalignment between the eye-box 58 and the eyellipse, the projected image may not be completely visible to the driver 62 or may appear, to the driver 62, to be incorrectly positioned.

Thus, the HUD system 50 must be calibrated to ensure that the eye-box 58 is properly positioned relative to the location of the eyes of the driver 62 (the eyellipse). In known systems, this involves using the DMS 66 to provide the location of the eyes of the driver 62 to the system controller 34A. However, multiple factors can introduce inaccuracy to the determined location of the eyes of the driver 62. First, current DMS 66 camera technology generally has built in inaccuracy of tens of millimeters.

Figure 6:
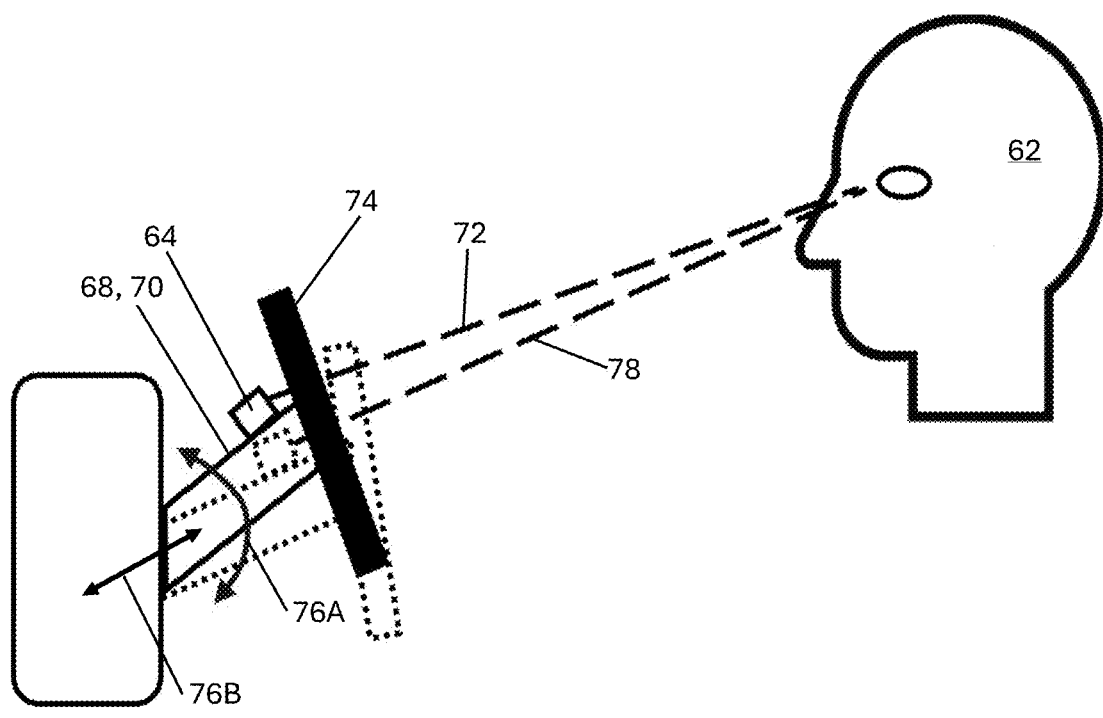
FIG. 6 is a schematic diagram of the head-up display system wherein a camera of the driver monitoring system is mounted onto a moveable steering column of the vehicle 10.

In addition, in many systems the camera 64 of the DMS 66 is mounted on a selectively moveable structure 68 within the vehicle 10. For example, referring to FIG. 6, the camera 64 of the DMS 66 is mounted onto a steering column 70 of the vehicle 10, wherein the camera 64 detects the position of the eyes of the driver 62, as indicated by dashed line 72. The steering column 70 is equipped with tilt-wheel capability, allowing the angle and height of the steering wheel 74 to be adjusted to the driver's 62 preferences, as indicated by arrow 76A, and further, allowing the distance of the steering wheel 74 from the driver 62 to be adjusted to the driver's preferences, as indicated by arrow 76B. Thus, at any time, the driver 62 can selectively move the steering column 70, thereby moving the camera 64 of the DMS 66 and changing the orientation of the camera 64 relative to the eyes of the driver 62, which may introduce inaccuracy in the location, by the system controller 34A, of the position of the eyes of the driver 62. As shown in FIG. 6, in a first position, the steering column 70, the steering wheel 74 and the camera 64 of the DMS 66 are shown in solid lines. In this first position, the camera "sees" the eyes of the driver 62 as indicated by the dashed line 72. The driver 62 may choose to adjust the steering column 70 and the steering wheel 74 to a second position. As shown in FIG. 6, the steering column 70A, the steering wheel 74A and the camera 64A are shown in the second position in dashed lines. In this second position, the camera 64A is in a different position and "sees" the eyes of the driver 62 from a different perspective, as indicated by dashed line 78.

Finally, the HUD system 50 itself may have built in inaccuracy from installation error. Generally, the position of the HUD system 50 within the vehicle 10 may vary by approximately plus or minus ten millimeters. Thus, the location of any projected image will have an inherent inaccuracy. These inaccuracies from the DMS 66 and from the HUD system 50 cause misalignment of projected augmented reality graphics that are projected assuming accurate eye location by the DMS 66 and accurate placement by the HUD system 50.

Thus, to account for such inaccuracies, the system controller 34A is adapted to initiate calibration of the HUD system 50. In an exemplary embodiment, the system controller 34A is adapted to initiate calibration of the HUD system 50 upon at least one of detection, by the system controller 34A, that the driver 62 of the vehicle 10 has entered the vehicle 10, and detection, by the system controller 34A with one of the plurality of sensing devices 40a-40n within the vehicle 10, movement of a selectively moveable structure 68 (such as the steering column 70 described above) within the vehicle 10 onto which the DMS 66 is mounted. Detection of a driver 62 entering the vehicle 10 triggers calibration to account for different characteristics (height, seating position) of a new driver 62. Detection of movement of the camera 64 of the DMS 66 (selective adjustment, by the driver 62, of the steering column 70) or movement of the driver 62 relative to the camera 64 of the DMS 66 (selective adjustment, by the driver 62, of the driver's seating position/orientation) triggers the system controller 34A to calibrate the HUD system 50 to account for the altered perspective of the camera 64 of the DMS 66.

When calibrating the HUD system 50, the system controller 34A is adapted to project, with a pattern projector 80 in communication with the system controller 34A and fixedly positioned relative to the PGU 52, an eye-box pattern 82 that is reflected from the inner surface 54 of the windshield 56 of the vehicle 10 to a face 84 of the driver 62 of the vehicle 10. The projected eye-box pattern 82 defines the eye-box 58 of the HUD system 50, is not visible to the driver 62 of the vehicle 10 and is detectable by the DMS 66.

Referring to FIG. 4A and FIG. 4B, the DMS 66 has a field of view (FOV) 86 within which the camera 64 of the DMS 66 can capture images. The camera 64 of the DMS 66 captures images containing the face 84 of the driver 62 and sends images of the face 84 of the driver 62 to the system controller 34A. The system controller 34A receives the captured images from the DMS 66 and analyzes the images with an image processing algorithm 94 using computer vision and image recognition techniques to identify the face 84 of the driver 62 and the eyes 88R, 88L of the driver 62.

Referring to FIG. 4A, the camera 64 of the DMS 66 identifies the face 84 of the driver 62 within the FOV 86 of the DMS 66 wherein the face 84 of the driver 62 is positioned high within the FOV 86 of the DMS 66, and, referring to FIG. 4B, the camera 64 of the DMS 66 identifies the face 84 of the driver 62 within the FOV 86 of the DMS 66 wherein the face 84 of the driver 62 is positioned lower within the FOV 86 of the DMS 66. The pattern projector 80 is mounted within the HUD system 50 in fixed relation to the PGU 52, thus, any inherent inaccuracy due to installation of the HUD system 50 applies to the PGU 52 and the pattern projector 80 equally, and thus, the eye-box pattern 82 projected by the pattern projector 80 accurately reflects the actual PGU 52 eye-box 58 boundaries. In addition, the captured relative location of the eye-box pattern 82 and the eyes 88R, 88L of the driver 62 by the DMS 66 remains the same when the camera 64 of the DMS 66 is at different locations, which removes the inaccuracy caused by the position of the camera 64 of the DMS 66 changing.

Referring again to FIG. 2, in an exemplary embodiment, the pattern projector 80 is mounted onto the PGU 52, wherein images projected from the PGU 52 are directed upward to the inner surface 54 of the windshield 56 and reflected outward to the eye-box 58 and the face 84 of the driver 62, as indicated by solid lines 60A, and the eye-box pattern 82 projected from the pattern projector 80 are directed upward to the inner surface 54 of the windshield 56 and reflected outward to the eye-box 58 and the face 84 of the driver 62, as indicated by dashed lines 90A. Referring to FIG. 3, in another exemplary embodiment, the pattern projector 80 and the PGU 52 are mounted onto a waveguide 92 of the HUD system 50, wherein images projected from the PGU 52 are directed upward to the inner surface 54 of the windshield 56 and reflected outward to the eye-box 58 and the face 84 of the driver 62, as indicated by solid lines 60B, and the eye-box pattern 82 projected from the pattern projector 80 are directed upward to the inner surface 54 of the windshield 56 and reflected outward to the eye-box 58 and the face 84 of the driver 62, as indicated by dashed lines 90B.

The pattern projector 80 is adapted to project the eye-box pattern 82 such that the driver 62 cannot see the projected eye-box pattern 82, but the camera 64 of the DMS 66 can detect the projected eye-box pattern 82. In an exemplary embodiment, the pattern projector 80 is adapted to project the eye-box pattern 82 at a non-visible wavelength that is less than 400 nano-meters or greater than 700 nano-meters and matches an operational wavelength of the DMS 66. Thus, the driver 62 will be unaware of the eye-box pattern 82 being projected onto their face 84, but the camera 64 of the DMS 66 can detect the projected eye-box pattern 82. This provides a visualization of the eye-box 58 in space that can be detected by the DMS 66. In exemplary embodiments, the pattern projector 80 is adapted to project the eye-box pattern 82 in one of infrared light or ultra-violet light.

Referring to FIG. 5, the system controller 34A receives images captured by the DMS 66 of the eye-box pattern 82 projected onto the face 84 of the driver 62 and uses the image processing algorithm 94 and computer vision and image recognition techniques to calculate a position of the eyes 88R, 88L of the driver 62 relative to the eye-box 58 by measuring a distance 96 from the eyes 88R, 88L of the driver 62 to a boundary of the eye-box pattern 82 along either one or both of a y-axis 98 and a z-axis 100, and calculating a depth position of the eyes 88R, 88L of the driver relative to the eye-box 58 along an x-axis 102 by measuring variation of the width 104 of the features of the projected eye-box pattern across the eye-box pattern. The system controller 34A uses known computer vision and image recognition techniques to measure distances along the y-axis 98 and the z-axis 100, and uses known image analysis techniques to analyze distortion and width 104 variation of different areas within the structured light pattern of the projected eye-box pattern 82 to calculate depth along the x-axis 102.

Figure 7:
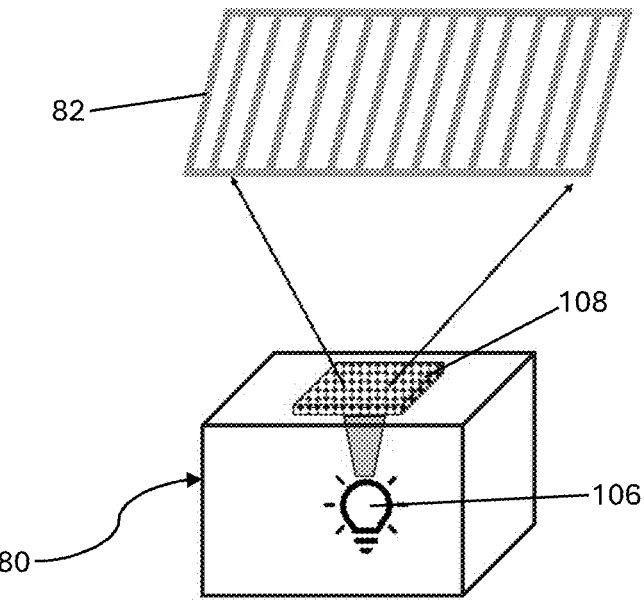
FIG. 7 is a schematic diagram of the pattern projector including a light source and a diffractive optical element.

As shown, the eye-box pattern 82 includes a border and vertical bands spanning across the eye-box pattern 82. Referring to FIG. 7, in an exemplary embodiment, the pattern projector 80 includes a light source 106 adapted to project non-visible light through a diffractive optical element 108 having a hologram for the eye-box pattern 82 encoded therein. The diffractive optical element 108 is one of a photosensitive material or a surface relief grating, wherein the non-visible light from the light source 106 passes through the diffractive optical element 108 and the eye-box pattern is reflected from the inner surface 54 of the windshield 56 of the vehicle 10 to the face 84 of the driver 62 of the vehicle 10.

Once the system controller 34A has determined the location of the eyes 88R, 88L of the driver 62 relative to the projected eye-box pattern 82, and thus, the eye-box 58, the system controller 34A is adapted to apply adjustments to the image projected by the PGU 52 based on the calculated position of the eyes 88R, 88L of the driver 62 relative to the eye-box 58 along the x-axis 102, y-axis 98 and z-axis 100.

In an exemplary embodiment, when applying adjustments to the image projected by the PGU 52 based on the calculated position of the eyes 88R, 88L of the driver 62 relative to the eye-box 58, the system controller 34A is further adapted to access a database 110 including a look-up table of pre-determined adjustment parameters for a plurality of locations across the eye-box 58. The look up table is populated with pre-determined adjustment parameters for specific locations across the eye-box 58. The system controller selects the pre-determined adjustment parameters corresponding to the calculated position of the eyes 88R, 88L of the driver 62 relative to the eye-box 58, and applies the selected pre-determined adjustment parameters to the image projected by the PGU 52.

Adjustment parameters may include application of an image shift to the image projected by the PGU 52, a warp map to the image projected by the PGU 52 and/or a luminance and color uniformity correction to the image projected by the PGU 52. An image shift adjusts the position of information and augmented reality images projected by the PGU 52 to ensure the information and augmented reality images projected by the PGU 52 appear properly located to the driver 62. A warp map is a digital compensation file that moves the position of the information and augmented reality images projected by the PGU 52 and applies distortion correction.

Thus, the HUD system 50 of the present disclosure "visualizes" the location of the eye-box 58 with a pattern projector 80 that is physically integrated within the HUD system 50 in fixed relation to the PGU 52, allowing calculation of the position of the eyes 88R, 88L of the driver 62 and application of adjustments that compensate for inaccuracies in placement of the projected information and augmented reality graphics from the PGU 52 due to movement of the camera 64 of the DMS 66 and inaccuracy of installation of the HUD system 50. The HUD system 50 of the present disclosure allows the positioning of the projected information and augmented reality graphics from the PGU 52 to be fine-tuned to compensate for such inaccuracies, ensuring increased accuracy in placement of the projected information and augmented reality graphics.

Figure 8:
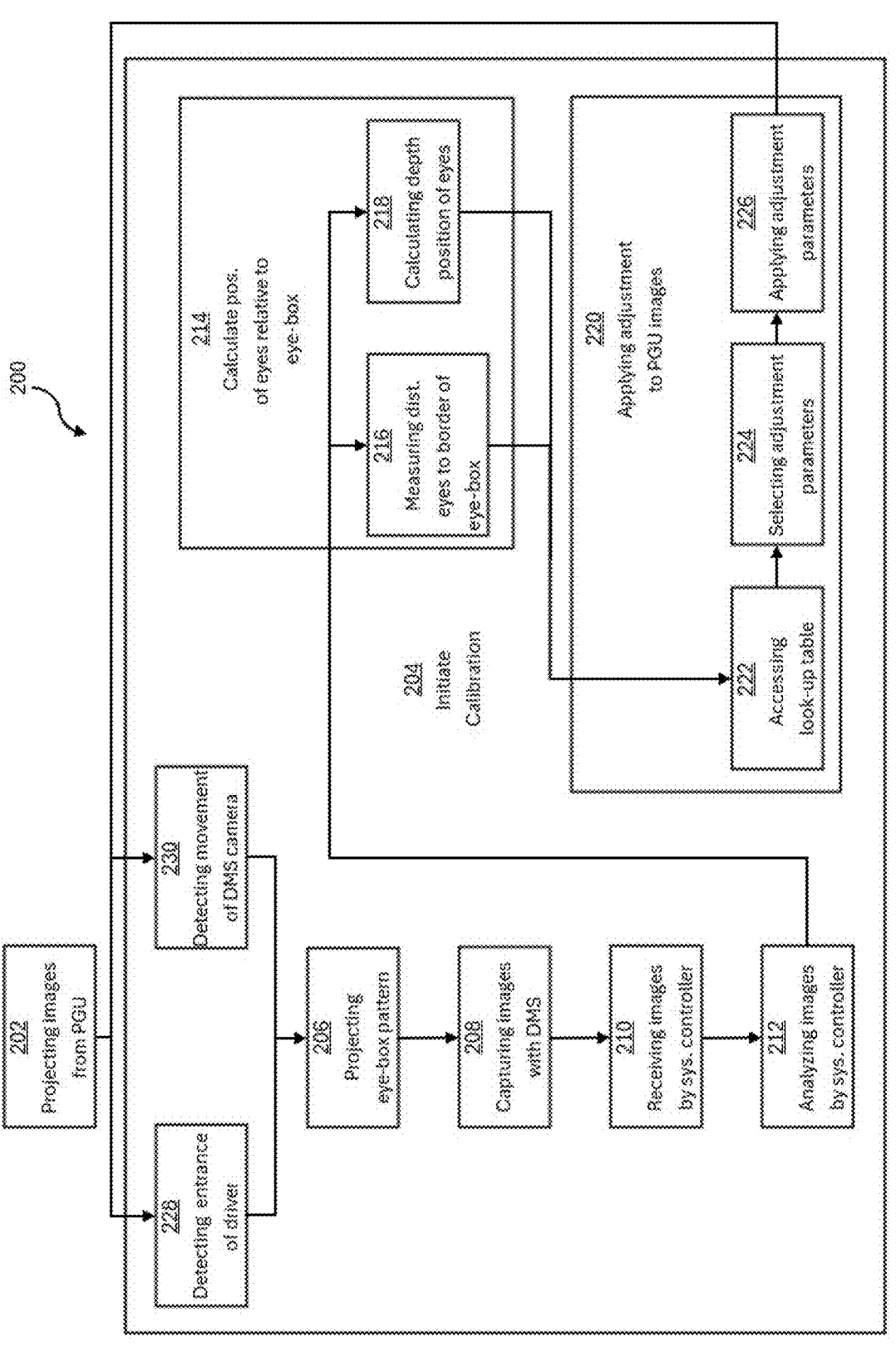
FIG. 8 is a flow chart representing a method according to an exemplary embodiment of the present disclosure.

Referring to FIG. 8, a method 200 of calibrating a head up display (HUD) system 50 within a vehicle 10 includes, moving to block 202, projecting, with a picture generation unit (PGU) 52 within the HUD system 50, augmented reality graphics that are reflected from an inner surface 54 of a windshield 56 of the vehicle 10 to an eye-box 58, and, moving to block 204, initiating, by a system controller 34A in communication with the PGU 52, calibration of the HUD system 50, including, moving to block 206, projecting, with a pattern projector 82 within the HUD system 50 in communication with the system controller 34A and fixedly positioned relative to the PGU 52, an eye-box pattern 82 that is reflected from the inner surface 54 of the windshield 56 of the vehicle 10 to a face 84 of a driver 62 of the vehicle 10, defines the eye-box 58 of the HUD system 50, is not visible to the driver 62 of the vehicle 10 and is detectable by a driver monitoring system (DMS) 66 within the vehicle 10 and in communication with the system controller 34A, moving to block 208, capturing, with the DMS 66, images containing the face 84 of the driver 62 and the eye-box pattern 82 projected thereon, moving to block 210, receiving, by the system controller 34A, the images captured by the DMS 66, moving to block 212, analyzing, by the system controller 34A, with an image processing algorithm 94, the images captured by the DMS 66, moving to block 214, calculating, by the system controller 34A, a position of eyes 88R, 88L of the driver 62 relative to the eye-box 58 by, moving to block 216, measuring a distance 96 from the eyes 88R, 88L of the driver 62 to a boundary of the eye-box pattern 82, and, moving to block 218, calculating a depth position of the eyes 88R, 88L of the driver 62 by measuring width 104 variation within the projected eye-box pattern 82, and, moving to block 220, applying, by the system controller 34A, adjustments to the image projected by the PGU 52 based on the calculated position of the eyes 88R, 88L of the driver 62 relative to the eye-box 58.

In an exemplary embodiment, the applying, by the system controller 34A, adjustments to the image projected by the PGU 52 based on the calculated position of the eyes 88R, 88L of the driver 62 relative to the eye-box 58 at block 220 further includes, moving to block 222, accessing, by the system controller 34A, a database 110 including a look-up table of pre-determined adjustment parameters for a plurality of locations across the eye-box 58, moving to block 224, selecting, by the system controller 34A, pre-determined adjustment parameters corresponding to the calculated position of the eyes 88R, 88L of the driver 62 relative to the eye-box 58, and, moving to block 226, applying, by the system controller 34A, the selected pre-determined adjustment parameters to the image projected by the PGU 52.

In an exemplary embodiment, the applying, by the system controller 34A, the selected pre-determined adjustment parameters to the image projected by the PGU 52 at block 226 further includes applying an image shift to the image projected by the PGU 52, applying a warp map to the image projected by the PGU 52, and applying a luminance and color uniformity correction to the image projected by the PGU 52.

In an exemplary embodiment, the projecting, with the pattern projector 80 within the HUD system 50, the eye-box pattern 82 at block 206 further includes projecting, with a pattern projector 80 that is mounted onto the PGU 52, the eye-box pattern 82.

In another exemplary embodiment, the projecting, with the pattern projector 80 within the HUD system 50, the eye-box pattern 82 at block 206 further includes projecting, with a pattern projector 80 that is mounted, along with the PGU 52, onto a waveguide 92 of the HUD system 50.

In an exemplary embodiment, the projecting, with the pattern projector 80 within the HUD system 50, the eye-box pattern 82 at block 206 further includes projecting, with the pattern projector 80 within the HUD system 50, the eye-box pattern 82 at a non-visible wavelength that matches an operational wavelength of the DMS 66.

In another exemplary embodiment, the projecting, with the pattern projector 80 within the HUD system 50, the eye-box pattern 82 at a non-visible wavelength at block 206 further includes projecting, with the pattern projector 80 within the HUD system 50, the eye-box pattern 82 at a wavelength that is less than 400 nano-meters or greater than 700 nano-meters.

In an exemplary embodiment, the projecting, with the pattern projector 80 within the HUD system 50, the eye-box pattern 82 at a non-visible wavelength at block 206 further includes projecting, with the pattern projector 80 within the HUD system 50, the eye-box pattern 82 in one of infrared light or ultra-violet light.

In an exemplary embodiment, the projecting, with the pattern projector 80 within the HUD system 50, the eye-box pattern 82 at block 206 further includes calculating a hologram for the eye-box pattern, encoding the hologram into a diffractive optical element 108, and projecting, with a light source 106 of the pattern projector 80 within the HUD system 50, non-visible light through the diffractive optical element 108 of the pattern projector 80, wherein the non-visible light passing through the diffractive optical element 80 is reflected from the inner surface 54 of the windshield 56 of the vehicle 10 to the face 84 of the driver 62 of the vehicle 10.

In another exemplary embodiment, the encoding the hologram into a diffractive optical element 108 at block 206 further includes one of encoding the hologram into a photosensitive material or encoding the hologram into a surface relief grating.

In another exemplary embodiment, the initiating, with the system controller 34A, calibration of the HUD system 50 at block 204 further includes at least one of, moving to block 228, detecting, by the system controller 34A, that the driver 62 of the vehicle 10 has entered the vehicle 10, and initiating, by the system controller 34A, calibration of the HUD system 50 upon detection, by the system controller 34A, that the driver 62 of the vehicle 10 has entered the vehicle 10, and, moving to block 230, detecting, by the system controller 34A with one of a plurality of sensing devices 40a-40n within the vehicle 10, movement of a selectively moveable structure 68 within the vehicle 10 onto which the DMS 66 is mounted, and initiating, by the system controller 34A, calibration of the HUD system 50 upon detection, by the system controller 34A, that the selectively moveable structure 68 has been moved. It should be understood by those skilled in the art that this could also include detection, by the system controller 34A, of real-time movement of the head and eyes of the driver 62 while driving.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of calibrating a head up display (HUD) system within a vehicle, comprising:

projecting, with a picture generation unit (PGU) within the HUD system, augmented reality graphics that are reflected from an inner surface of a windshield of the vehicle to an eye-box; and initiating, by a system controller in communication with the PGU, calibration of the HUD system, including:

projecting, with a pattern projector within the HUD system in communication with the system controller and fixedly positioned relative to the PGU, an eye-box pattern that is reflected from the inner surface of the windshield of the vehicle to a face of a driver of the vehicle, defines the eye-box of the HUD system, is not visible to the driver of the vehicle and is detectable by a driver monitoring system (DMS) within the vehicle and in communication with the system controller;

capturing, with the DMS, images containing the face of the driver and the eye-box pattern projected thereon;

receiving, by the system controller, the images captured by the DMS;

analyzing, by the system controller, with an image processing algorithm, the images captured by the DMS;

calculating, by the system controller, a position of eyes of the driver relative to the eye-box by:

measuring a distance from the eyes of the driver to a boundary of the eye-box pattern; and calculating a depth position of the eyes of the driver by measuring width variation within the projected eye-box pattern; and applying, by the system controller, adjustments to the image projected by the PGU based on the calculated position of the eyes of the driver relative to the eye-box.

2. The method of claim 1, wherein the applying, by the system controller, adjustments to the image projected by the PGU based on the calculated position of the eyes of the driver relative to the eye-box further includes:

accessing, by the system controller, a database including a look-up table of pre-determined adjustment parameters for a plurality of locations across the eye-box;

selecting, by the system controller, pre-determined adjustment parameters corresponding to the calculated position of the eyes of the driver relative to the eye-box; and applying, by the system controller, the selected pre-determined adjustment parameters to the image projected by the PGU.

3. The method of claim 2, wherein the applying, by the system controller, the selected pre-determined adjustment parameters to the image projected by the PGU further includes:

applying an image shift to the image projected by the PGU;

applying a warp map to the image projected by the PGU; and applying a luminance and color uniformity correction to the image projected by the PGU.

4. The method of claim 3, wherein the projecting, with the pattern projector within the HUD system, the eye-box pattern further includes projecting, with a pattern projector that is mounted onto the PGU, the eye-box pattern.

5. The method of claim 3, wherein the projecting, with the pattern projector within the HUD system, the eye-box pattern further includes projecting, with a pattern projector that is mounted, along with the PGU, onto a waveguide of the HUD system.

6. The method of claim 3, wherein the projecting, with the pattern projector within the HUD system, the eye-box pattern further includes projecting, with the pattern projector within the HUD system, the eye-box pattern at a non-visible wavelength that matches an operational wavelength of the DMS.

7. The method of claim 6, wherein the projecting, with the pattern projector within the HUD system, the eye-box pattern at a non-visible wavelength further includes projecting, with the pattern projector within the HUD system, the eye-box pattern at a wavelength that is less than 400 nano-meters or greater than 700 nano-meters.

8. The method of claim 7, wherein the projecting, with the pattern projector within the HUD system, the eye-box pattern at a non-visible wavelength further includes projecting, with the pattern projector within the HUD system, the eye-box pattern in one of infrared light or ultra-violet light.

9. The method of claim 3, wherein the projecting, with the pattern projector within the HUD system, the eye-box pattern further includes:

calculating a hologram for the eye-box pattern;

encoding the hologram into a diffractive optical element;

projecting, with a light source of the pattern projector within the HUD system, non-visible light through the diffractive optical element of the pattern projector, wherein the non-visible light passing through the diffractive optical element is reflected from the inner surface of the windshield of the vehicle to the face of the driver of the vehicle.

10. The method of claim 9, wherein the encoding the hologram into a diffractive optical element further includes one of:

encoding the hologram into a photosensitive material; or encoding the hologram into a surface relief grating.

11. The method of claim 1, wherein the initiating, with the system controller, calibration of the HUD system further includes at least one of:

detecting, by the system controller, that the driver of the vehicle has entered the vehicle, and initiating, by the system controller, calibration of the HUD system upon detection, by the system controller, that the driver of the vehicle has entered the vehicle; and detecting, by the system controller with one of a plurality of sensing devices within the vehicle, movement of a selectively moveable structure within the vehicle onto which the DMS is mounted, and initiating, by the system controller, calibration of the HUD system upon detection, by the system controller, that the selectively moveable structure has been moved.

12. A head up display (HUD) system within a vehicle, comprising:

a picture generation unit (PGU) adapted to project augmented reality graphics that are reflected from an inner surface of a windshield of the vehicle to an eye-box; and a system controller in communication with the PGU and adapted to initiate calibration of the HUD system, including, with the system controller:

project, with a pattern projector in communication with the system controller and fixedly positioned relative to the PGU, an eye-box pattern that is reflected from the inner surface of the windshield of the vehicle to a face of a driver of the vehicle, defines the eye-box of the HUD system, is not visible to the driver of the vehicle and is detectable by a driver monitoring system (DMS) within the vehicle and in communication with the system controller;

capture, with the DMS, images containing the face of the driver and the eye-box pattern projected thereon;

receive the images captured by the DMS;

analyze, an image processing algorithm, the images captured by the DMS;

calculate a position of eyes of the driver relative to the eye-box by measuring a distance from the eyes of the driver to a boundary of the eye-box pattern, and calculating a depth position of the eyes of the driver by measuring width variation within the projected eye-box pattern; and apply adjustments to the image projected by the PGU based on the calculated position of the eyes of the driver relative to the eye-box.

13. The system of claim 12, wherein when applying adjustments to the image projected by the PGU based on the calculated position of the eyes of the driver relative to the eye-box, the system controller is further adapted to:

access a database including a look-up table of pre-determined adjustment parameters for a plurality of locations across the eye-box;

select pre-determined adjustment parameters corresponding to the calculated position of the eyes of the driver relative to the eye-box; and apply the selected pre-determined adjustment parameters to the image projected by the PGU, including:

applying an image shift to the image projected by the PGU;

applying a warp map to the image projected by the PGU; and applying a luminance and color uniformity correction to the image projected by the PGU.

14. The system of claim 13, wherein the pattern projector is mounted onto the PGU.

15. The system of claim 13, wherein the pattern projector and the PGU are mounted onto a waveguide of the HUD system.

16. The system of claim 13, wherein the pattern projector is adapted to project the eye-box pattern at a non-visible wavelength that is less than 400 nano-meters or greater than 700 nano-meters and matches an operational wavelength of the DMS.

17. The system of claim 16, wherein the pattern projector is adapted to project the eye-box pattern in one of infrared light or ultra-violet light.

18. The system of claim 13, wherein the pattern projector includes a light source adapted to project non-visible light through a diffractive optical element having a hologram for the eye-box pattern encoded therein, wherein:

the diffractive optical element is one of a photosensitive material or a surface relief grating; and the non-visible light passing through the diffractive optical element is reflected from the inner surface of the windshield of the vehicle to the face of the driver of the vehicle.

19. The system claim 12, wherein the system controller is adapted to initiate calibration of the HUD system upon at least one of:

detection, by the system controller, that the driver of the vehicle has entered the vehicle; and detection, by the system controller with one of a plurality of sensing devices within the vehicle, movement of a selectively moveable structure within the vehicle onto which the DMS is mounted.

20. A vehicle having a head up display (HUD) system, the HUD system comprising:

a picture generation unit (PGU) adapted to project augmented reality graphics that are reflected from an inner surface of a windshield of the vehicle to an eye-box; and a system controller in communication with the PGU and adapted to initiate calibration of the HUD system, including, with the system controller:

project, with a pattern projector in communication with the system controller and fixedly positioned relative to the PGU, an eye-box pattern that is:

reflected from the inner surface of the windshield of the vehicle to a face of a driver of the vehicle;

defines the eye-box of the HUD system; and has a non-visible wavelength that is less than 400 nano-meters or greater than 700 nano-meters and matches an operational wavelength of a drive monitoring system (DMS) within the vehicle and in communication with the system controller;

capture, with the DMS, images containing the face of the driver and the eye-box pattern projected thereon;

receive the images captured by the DMS;

analyze, an image processing algorithm, the images captured by the DMS;

calculate a position of eyes of the driver relative to the eye-box by measuring a distance from the eyes of the driver to a boundary of the eye-box pattern, and calculating a depth position of the eyes of the driver by measuring width variation within the projected eye-box pattern;

access a database including a look-up table of pre-determined adjustment parameters for a plurality of locations across the eye-box;

select pre-determined adjustment parameters corresponding to the calculated position of the eyes of the driver relative to the eye-box; and apply the selected pre-determined adjustment parameters to the image projected by the PGU, including:

applying an image shift to the image projected by the PGU;

applying a warp map to the image projected by the PGU; and applying a luminance and color uniformity correction to the image projected by the PGU.

* * * * *